United States Patent
Delcasso et al.

(10) Patent No.: US 12,471,540 B2
(45) Date of Patent: Nov. 18, 2025

(54) DETECTION DEVICE FOR METAL STAKES IN A WIRE-TRAINED PLANT-CROP HEDGE

(71) Applicant: PELLENC, Pertuis (FR)

(72) Inventors: Laurent Delcasso, Pertuis (FR); Sébastien Artinian, Pertuis (FR); Raphaël Arnauts, Les Milles (FR)

( * ) Notice: Subject to any disclaimer, the term of this patent is extended or adjusted under 35 U.S.C. 154(b) by 573 days.

(21) Appl. No.: 18/065,700

(22) Filed: Dec. 14, 2022

(65) Prior Publication Data

US 2023/0189703 A1     Jun. 22, 2023

(30) Foreign Application Priority Data

Dec. 20, 2021    (FR) ...................................... 2114020

(51) Int. Cl.
*A01G 3/04*     (2006.01)
*A01B 39/16*    (2006.01)
(Continued)

(52) U.S. Cl.
CPC ............ *A01G 3/0408* (2013.01); *A01B 39/16* (2013.01); *A01G 17/02* (2013.01); *G01V 3/10* (2013.01);
(Continued)

(58) Field of Classification Search
CPC ........ G01V 3/10; A01G 3/0408; A01G 17/02; A01D 46/28; A01D 46/26; A01D 34/73;
(Continued)

(56) References Cited

U.S. PATENT DOCUMENTS

| | | | | |
|---|---|---|---|---|
| 4,543,775 A | * | 10/1985 | Horn .................... | A01G 3/0408 56/235 |
| 6,634,162 B1 | * | 10/2003 | Andros .................. | A01G 17/02 56/328.1 |

(Continued)

FOREIGN PATENT DOCUMENTS

| | | | | |
|---|---|---|---|---|
| DE | 2929565 A1 | * | 2/1981 | ........... G05D 1/0265 |
| DE | 20109279 U1 | * | 11/2001 | ........... A01B 69/028 |

(Continued)

OTHER PUBLICATIONS

Search Report and Opinion for French Priority Application No. 21/14020, dated Jul. 19, 2022.

*Primary Examiner* — Arpad Fabian-Kovacs
(74) *Attorney, Agent, or Firm* — Egbert, McDaniel & Swartz, PLLC

(57) ABSTRACT

A detection device for metal stakes in a wire-trained plant-crop hedge having at least one detector configured to generate a detection signal when it passes next to a metal stake of the hedge wherein the metal stake detector has a first and a second metal detector arranged for generating respectively a first and a second measurement signal when they pass next to one of the metal stakes of the hedge. The first and second metal detectors are mechanically secured to each other in movement and arranged for being spaced vertically relative to each other. The detection device has an electronic management unit for the detection signals, configured for, upon detection of a temporal offset between the maximum variation levels of the first and second measurement signals, generating a signal indicating an inclined state of the metal stake.

16 Claims, 10 Drawing Sheets

(51) Int. Cl.
*A01G 17/02* (2006.01)
*G01V 3/10* (2006.01)
*A01D 34/00* (2006.01)
*A01D 34/06* (2006.01)
*A01D 34/66* (2006.01)
*A01D 34/73* (2006.01)
*A01D 46/26* (2006.01)
*A01D 46/28* (2006.01)

(52) U.S. Cl.
CPC ............ *A01D 34/006* (2013.01); *A01D 34/06* (2013.01); *A01D 34/66* (2013.01); *A01D 34/73* (2013.01); *A01D 46/26* (2013.01); *A01D 46/28* (2013.01)

(58) Field of Classification Search
CPC ...... A01D 34/66; A01D 34/06; A01D 34/006; A01B 39/16
See application file for complete search history.

(56) References Cited

U.S. PATENT DOCUMENTS

| | | | |
|---|---|---|---|
| 7,748,206 B1 | 7/2010 | Posselius | |
| 7,870,712 B2 | 1/2011 | Pellenc | |
| 8,230,671 B2* | 7/2012 | Pellenc | ................ A01G 3/0408 56/235 |
| 9,049,820 B2* | 6/2015 | Skipper | ..................... A01G 3/04 |
| 10,091,952 B2* | 10/2018 | Pellenc | ................ A01G 17/005 |
| 2005/0039431 A1* | 2/2005 | Schloesser | ............. A01D 46/28 56/340.1 |
| 2006/0272201 A1 | 12/2006 | Pellenc | |

FOREIGN PATENT DOCUMENTS

| | | | | |
|---|---|---|---|---|
| EP | 0571873 A1 * | 12/1993 | ............. A01G 17/00 |
| EP | 0732599 B1 * | 8/2002 | ............... G01V 3/10 |
| EP | 1608216 A2 | 12/2005 | |
| EP | 2227939 B1 | 11/2012 | |
| FR | 2473258 A1 * | 7/1981 | ............. A01D 46/28 |
| FR | 2810498 A1 * | 12/2001 | ........... A01B 3/1112 |
| FR | 2843206 A1 * | 2/2004 | ........... A01B 69/008 |
| FR | 2878124 A1 | 5/2006 | |
| FR | 2893223 A1 | 5/2007 | |

* cited by examiner

[Fig 1]
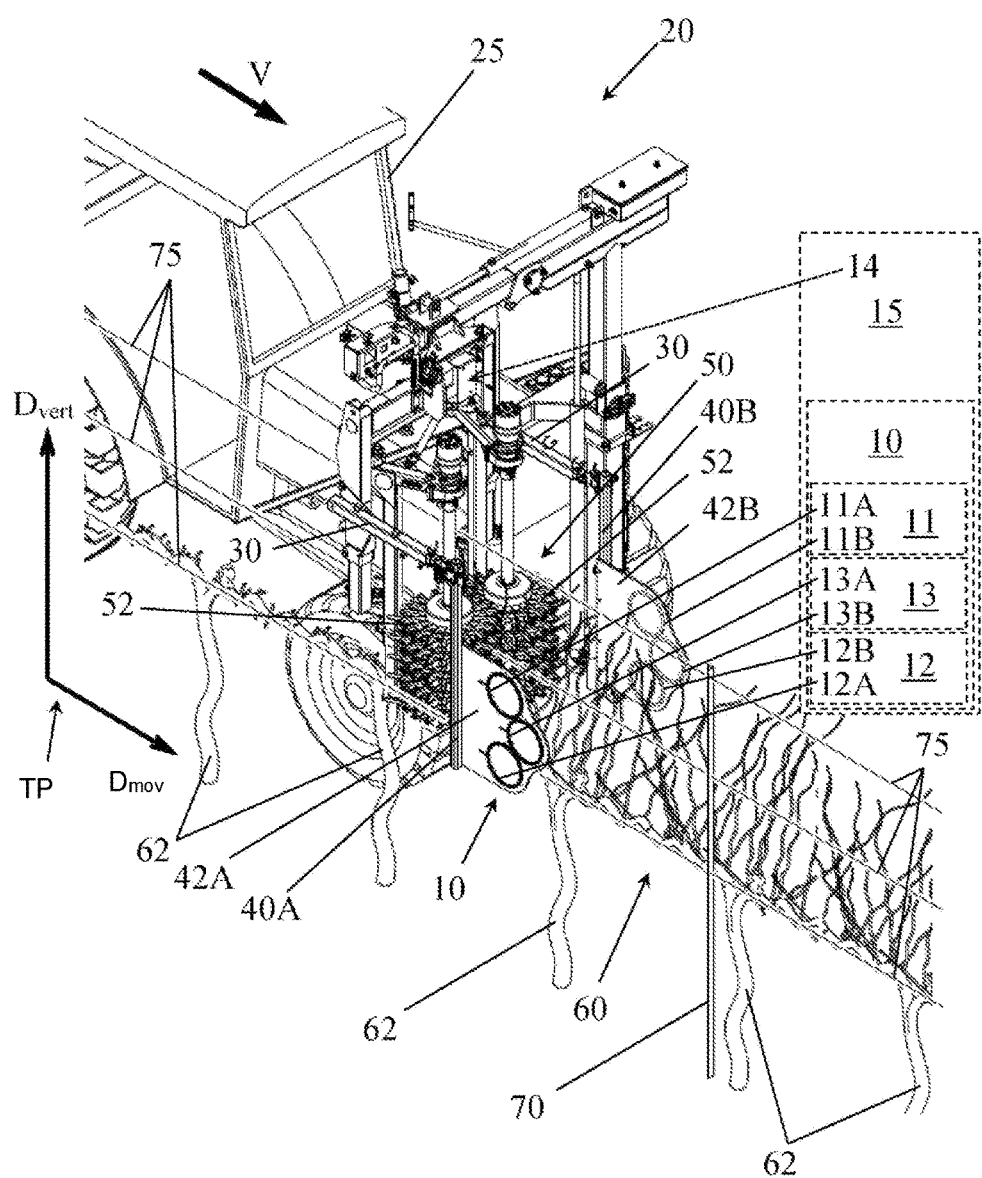

[Fig 2]
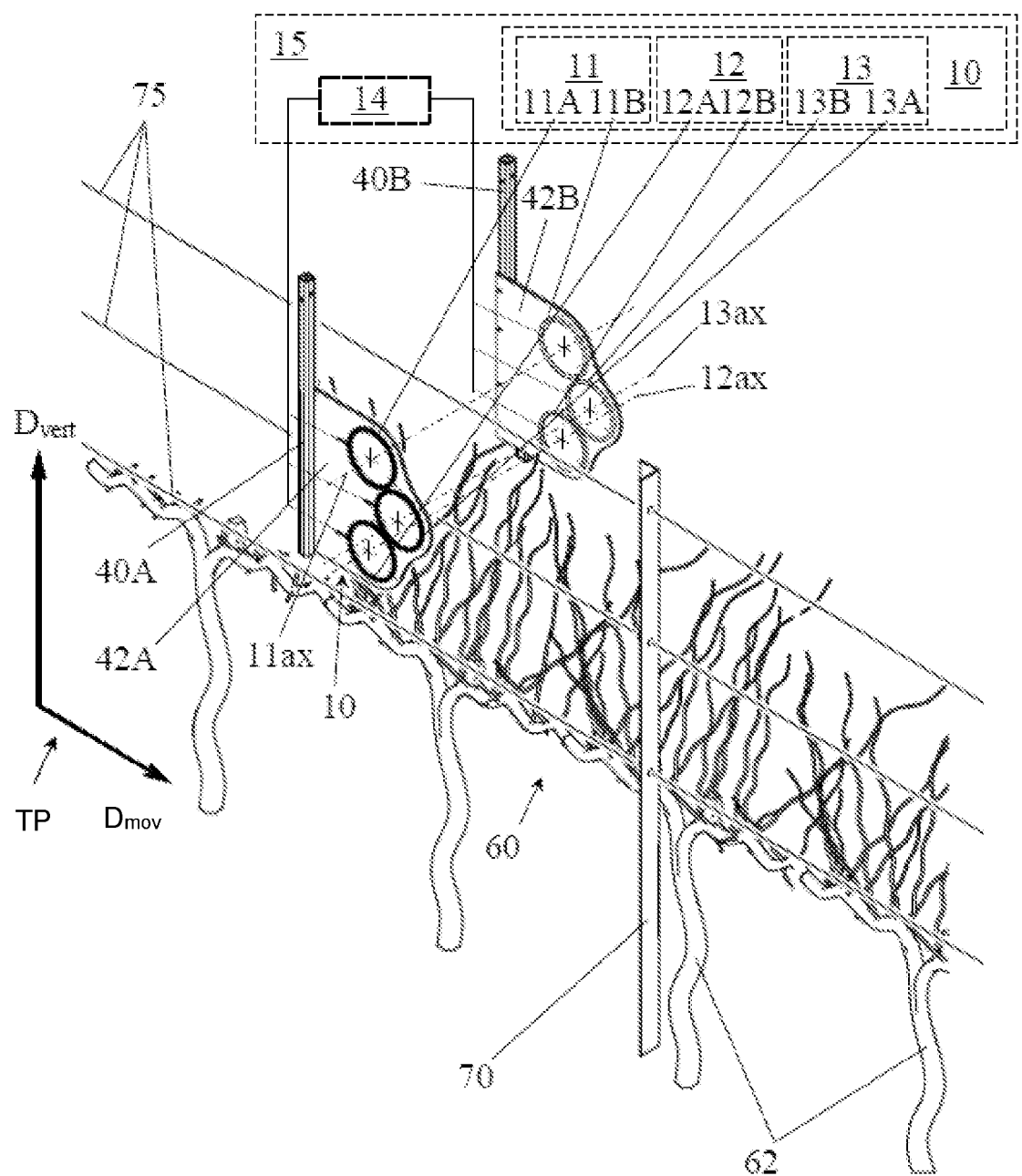

[Fig 3A]
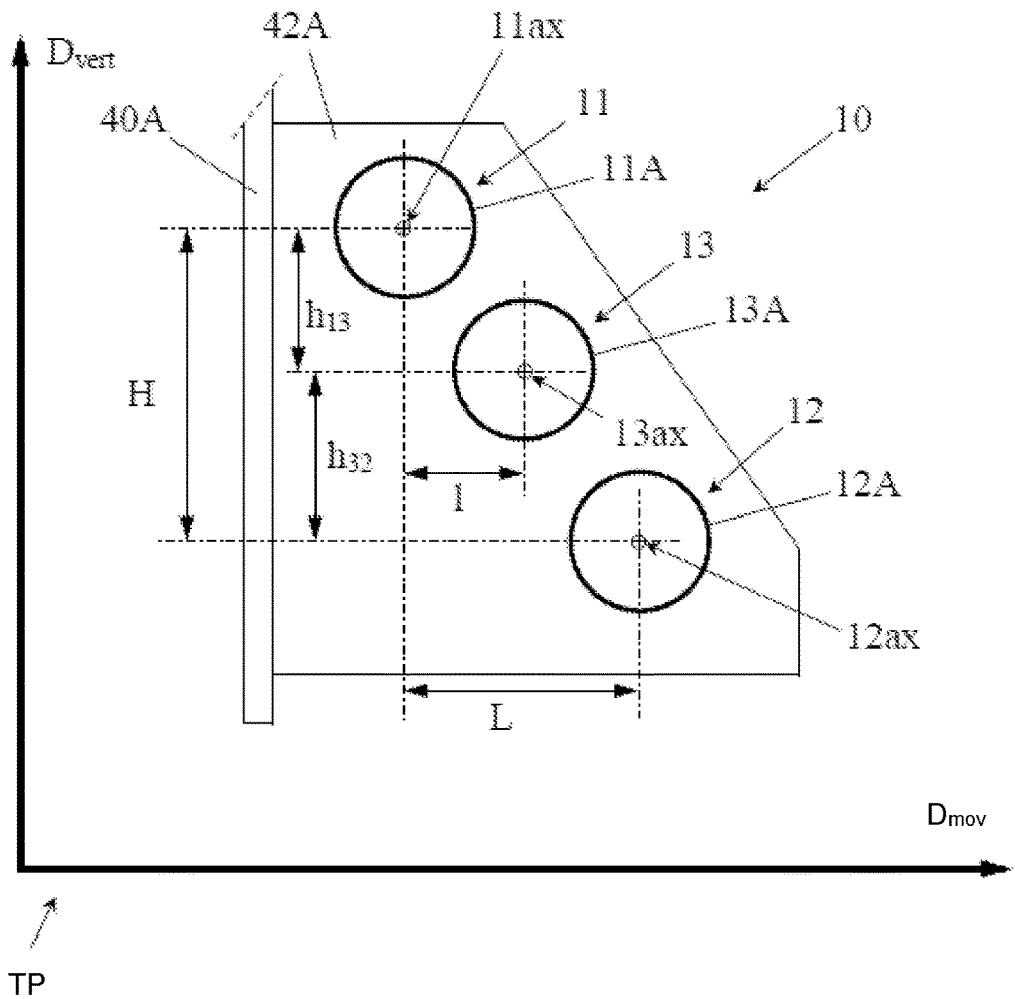
TP
[Fig 3B]
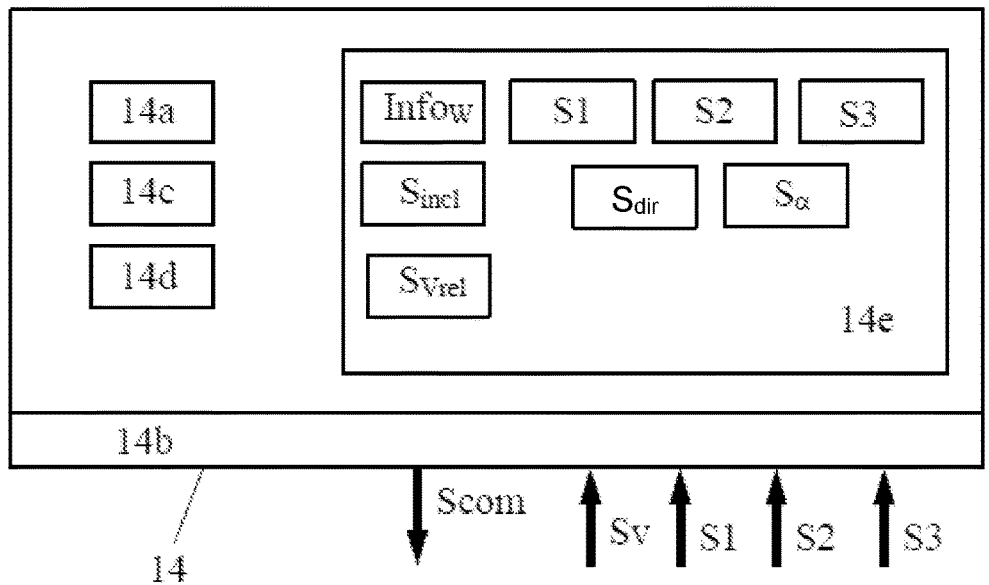

[Fig 4]
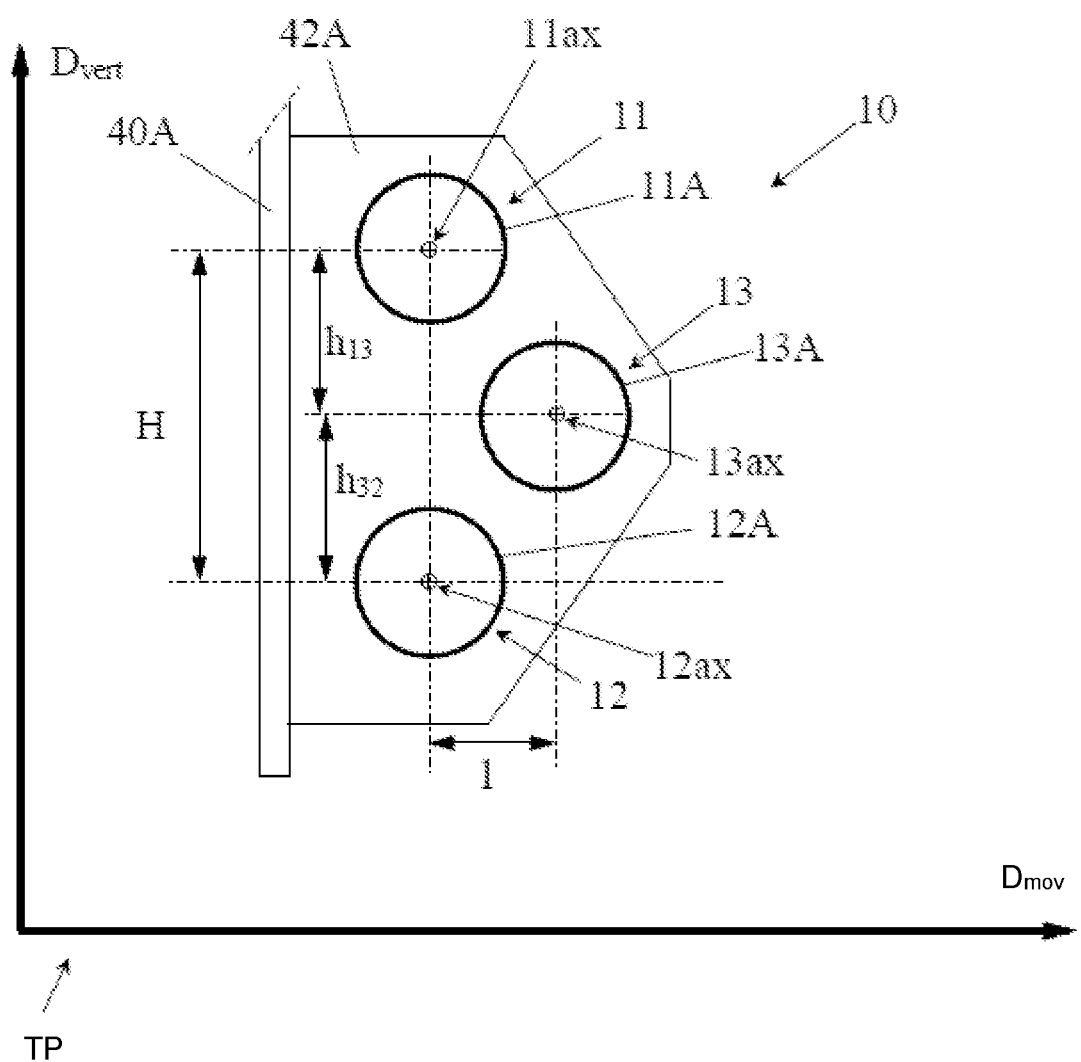

[Fig 5A]
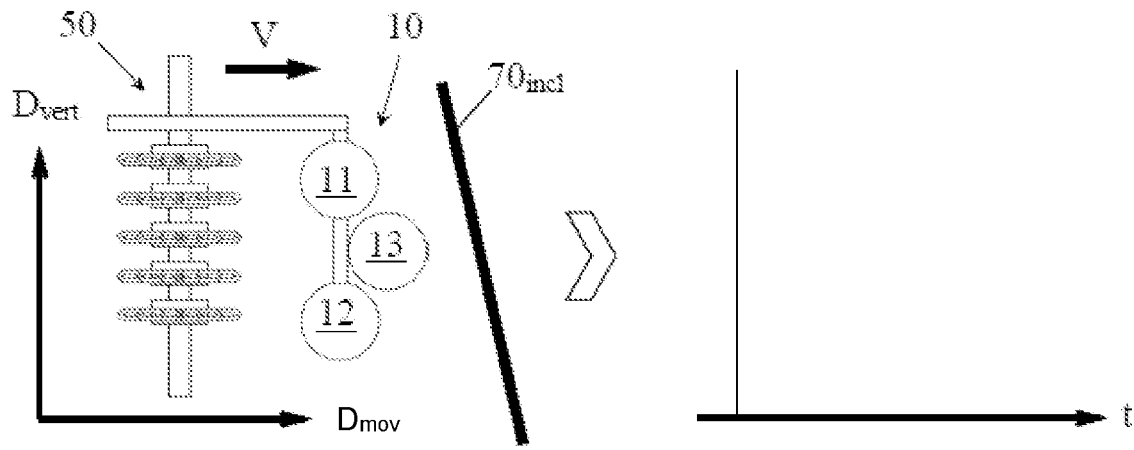
[Fig 5B]
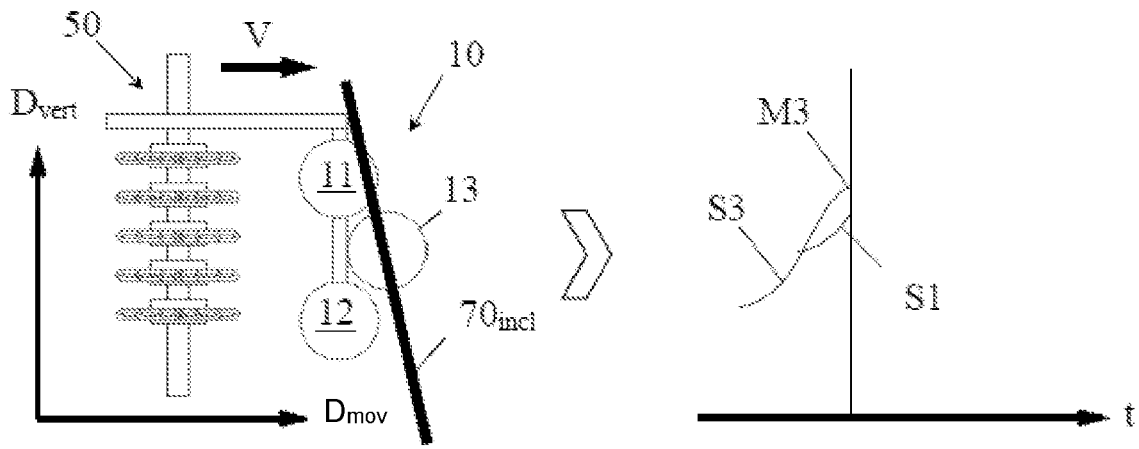
[Fig 5C]
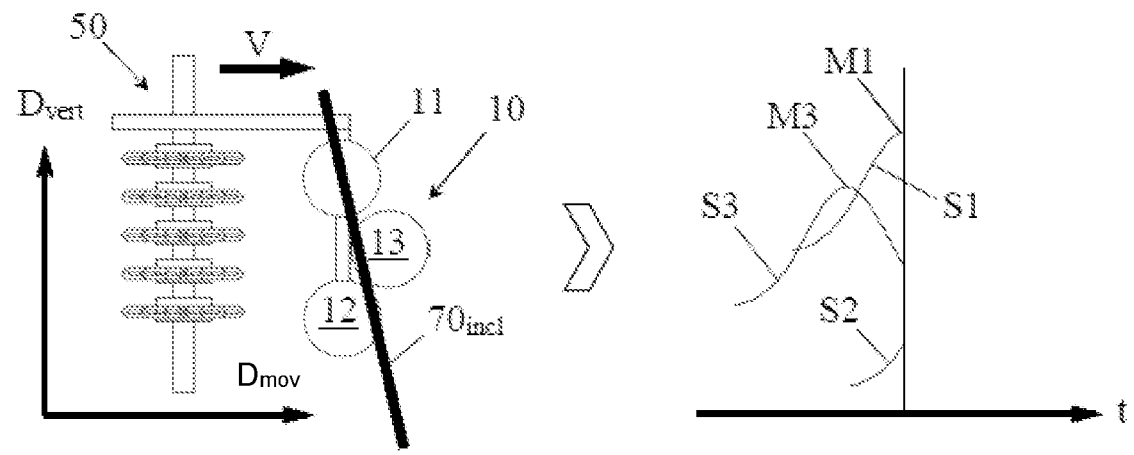

[Fig 5D]
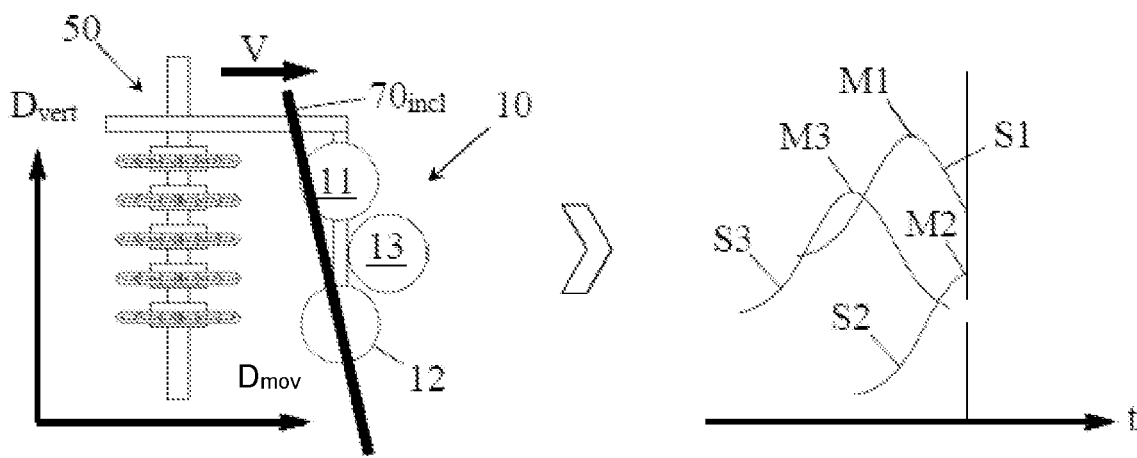
[Fig 5E]
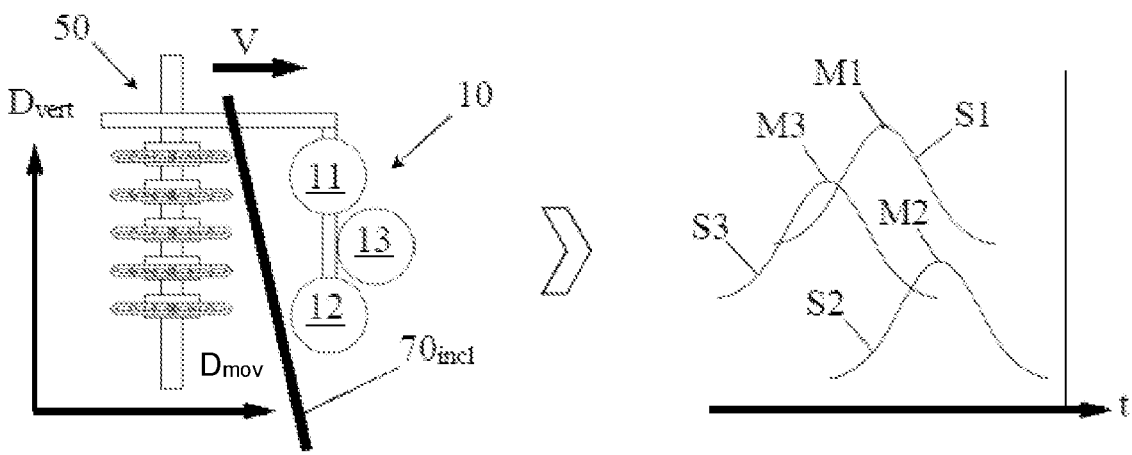

[Fig 6A]
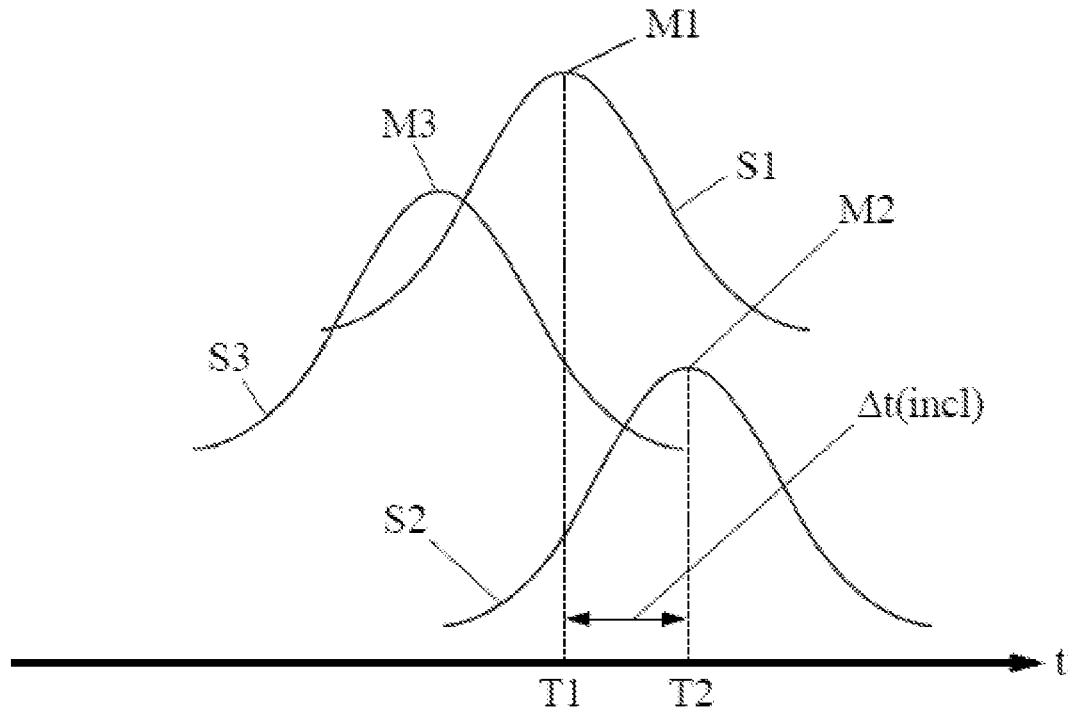
[Fig 6B]
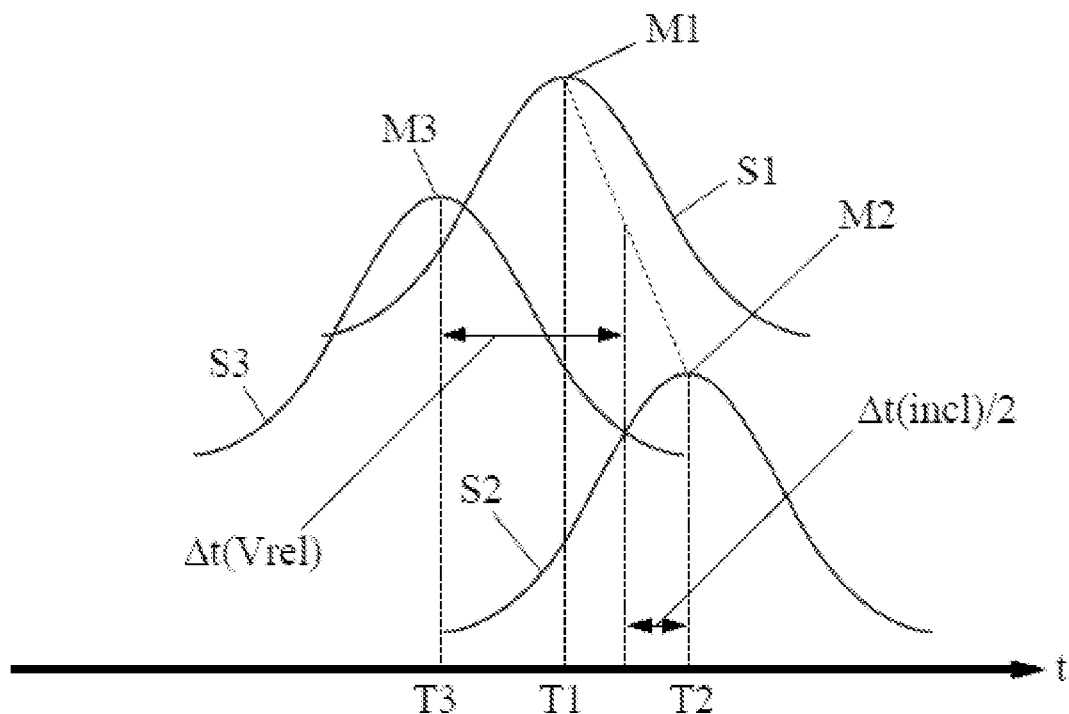

[Fig 7A]
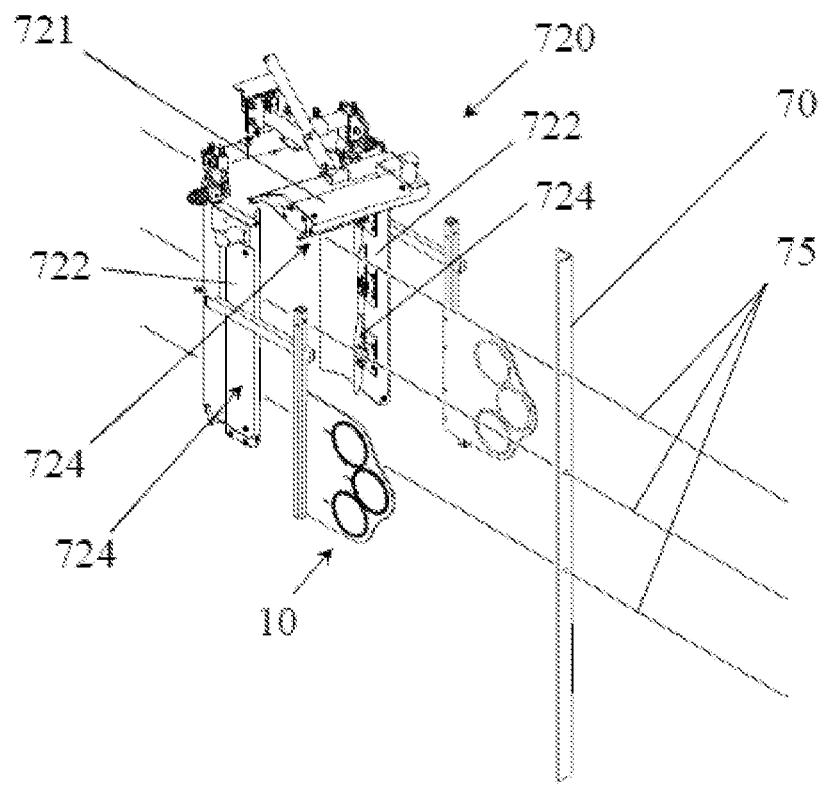

[Fig 7B]
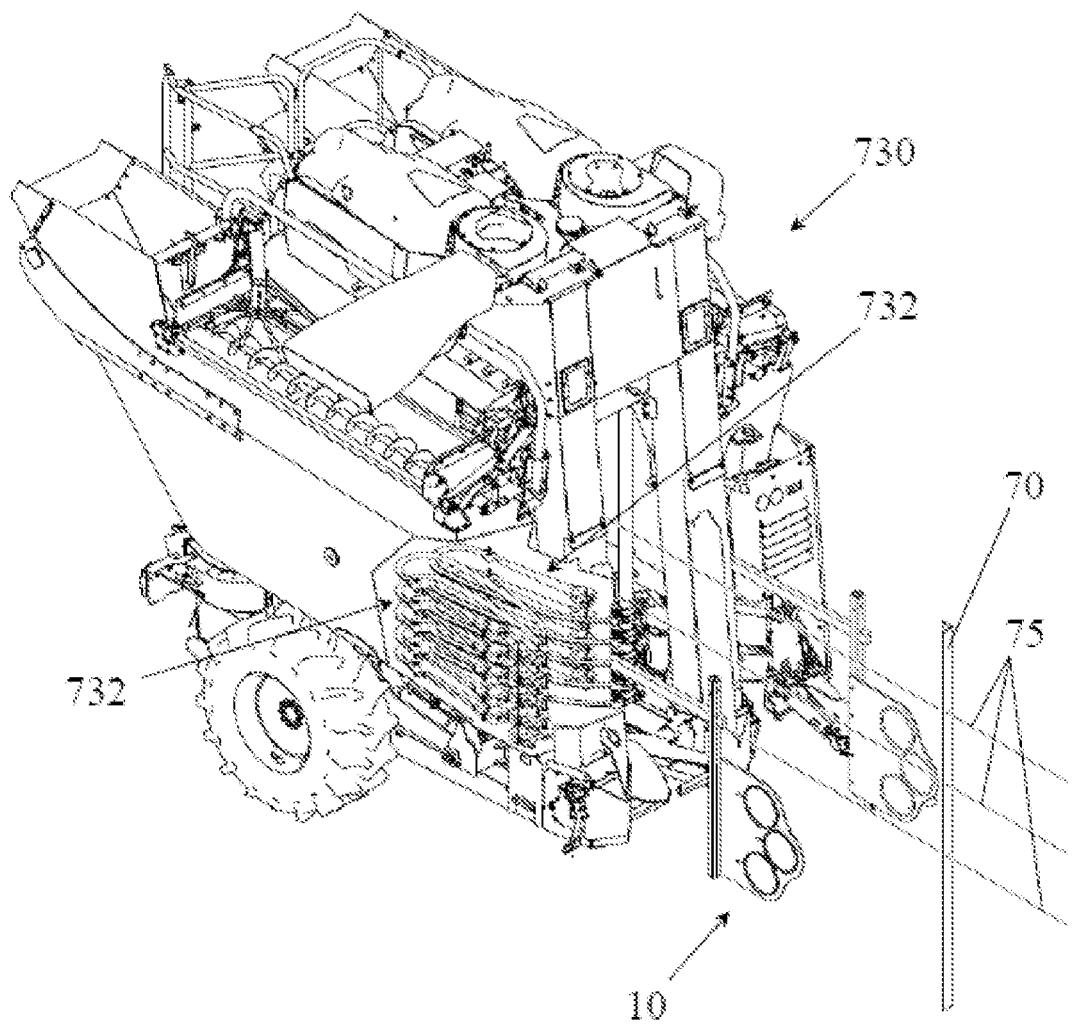

[Fig 8]
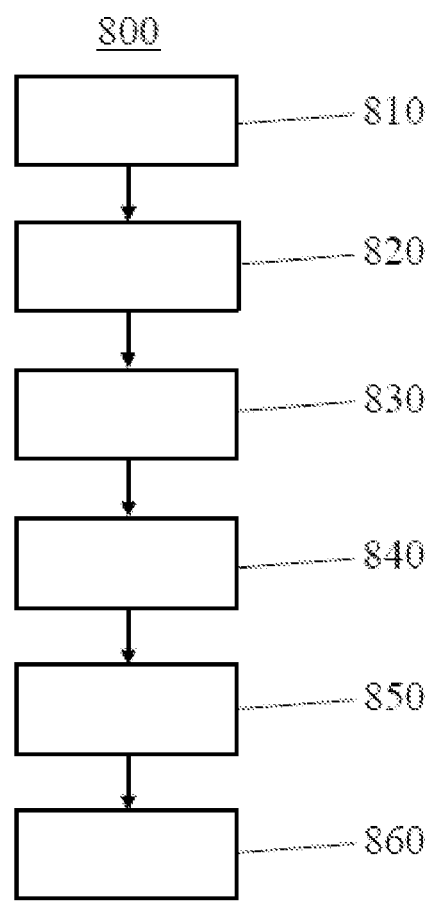

DETECTION DEVICE FOR METAL STAKES IN A WIRE-TRAINED PLANT-CROP HEDGE

FIELD OF THE INVENTION

The invention relates to a detection device for metal stakes in a wire-trained plant-crop hedge, and also agricultural equipment equipped with a detection device and a method for avoiding a metal stake by a working member of agricultural equipment equipped with a detection device, where said device is able to detect the stakes hidden by the vegetation.

DESCRIPTION OF RELATED ART

In the agricultural field, various crops are grown using metal stakes supporting wire-trained plant-crop hedges such as rows of vines or other fruit-bearing shrubs, fruit trees, etc.

Such wire-trained plant-crop hedges may be worked mechanically by means of agricultural equipment equipped with one or more working members and intended, for example, for cutting, topping, or harvesting operations or for working the soil.

However, the mechanical working of these hedges containing stakes ordinarily requires avoiding the stakes by the working members, either for avoiding damaging the stakes and therefore the whole of the hedge that it supports, or for avoiding damaging the working members themselves during passage thereof around the stakes.

Thus, the European patent EP 2,227,939 B1 describes agricultural equipment for fruit harvesting equipped with a detector located ahead of a working member, which is in this case a shaking member intended to exert forces against the hedge in order to detach the fruit.

The presence of a stake is detected by the detector, and this information, coupled with the speed of movement of the agricultural equipment along the hedge, allows the shaking member when passing near the stake to automatically reduce the force exerted by the shaking member for a sufficient length of time in order to avoid damage to the stake or to the shaking member.

However, this solution is not entirely satisfactory: generally, the time for avoiding the stakes by the working member must be minimized so as to work a hedge the most completely possible in order to improve the effectiveness of the mechanical working and in order to minimize the quantity of rework to be done manually.

This constraint however conflicts with the need to avoid damaging the stakes of the hedge or the working member.

Further, anticipating the arrival of the stake in the working member is based on the assumption of a vertical stake that this detector detects at a set height.

Thus, if the stake is inclined, it is possible that the working member is not deactivated in time so the first part of the stake starts to traverse it and as a corollary it is possible that the working member is reactivated before the last part of the stake has passed, potentially damaging at least one part of the working member.

In a similar field, the patent EP 1,608,216 describes agricultural equipment comprising an optical detection device able to detect stakes when vegetation is not present.

In fact, this device operates on the principle of occulting light beams for detecting the presence of the stake and deactivating a working member of the agricultural equipment. However, the presence of vegetation such as leaves, for example, masks the light beam, so that the presence of a stake cannot be detected.

BRIEF SUMMARY OF THE INVENTION

The object of the invention is to substantially improve the detection of elements which could damage or be damaged by a working member of agricultural equipment for working a wire-trained plant-crop hedge, while not being disturbed by other obstacles such as leaves, for example.

The invention starts from the observation that most wire-trained plant hedges comprise metal stakes in order to provide for the stiffness and longevity of the trellis, where these metal stakes are essentially made up of iron and covered as necessary with a coating protecting against rust (e.g., using, plastic, even concrete).

In the case of the vine and according to the type of vine, the stakes have a height ranging from 1 to 2 m above the ground.

The invention more specifically covers a detection device for metal stakes in a wire-trained plant-crop hedge, comprising at least one metal stake detector designed for being moved parallel to a trellis plane of the hedge and arranged for generating a detection signal when it passes next to a metal stake of the hedge which comprises metal stakes, detection device in which said metal stake detector comprises a first and a second metal detector arranged for generating respectively a first and a second measurement signal when they pass next to one of the metal stakes of the hedge, where said first and second metal detectors are mechanically secured to each other in movement and arranged for being spaced vertically relative to each other during use of said device, where the detection device further comprises an electronic management unit for said first and second detection signals, configured for receiving the first measurement signal and the second measurement signal and for, upon detection of a temporal offset between the maximum variation levels of the first and second measurement signals, generating a signal indicating an inclined state of the metal stake relative to a vertical direction in the trellis plane.

Not only can the metal stake detection device according to the invention detect the simple presence of a metal stake even masked by the vegetation of the hedge, but also determine that this stake is inclined in the trellis plane relative to the vertical and deliver a corresponding detection signal, where this detection signal serves to better drive the working members of agricultural equipment equipped with this device upon passing the stake.

Thus, with the inclination information for an approaching stake in addition to the detection of the stake, it is possible to optimize the control of the working members so as to optimize the use thereof while also reducing the risk of damage to the material of the hedge or of the working members upon passing the stake.

The metal stake detection device according to the invention may have the following characteristics:
  an electronic management unit may be configured for generating a signal representative of a direction of inclination of the inclined metal stake on the basis of a time-sequence order between the maximum variation levels of the first and second measurement signals;
  the first and second metal detector may each comprise an emitting coil and a receiving coil defining a detection axis on which a metal stake detection signal generated by the detection coil in response to a signal coming from the receiving coil is a maximum when the corresponding detector passes next to a metal stake, and the first and second measurement signal can be generated by the detection coil of the first and second detectors, respectively;

the detection device may comprise a detection gate mobile along the trellis plane, where said detection gate may comprise a first and a second gate branch designed for, during use, facing and moving parallel to the trellis plane, where the first gate branch may comprise one of the emitting coils and of the receiving coils of the first and the second metal detector, where the second gate branch may comprise the other of the emitting coil and the receiving coil of the first and second metal detectors, where the coils may be mounted on the gate branches such that, during use, the detection axes of the metal detectors are vertically separated from each other;

the first gate branch and the second gate branch may be designed for, during use, framing the trellis plane;

the electronic management unit may further be configured so as to receive a signal representative of a movement speed of agricultural equipment, generated and sent by the agricultural equipment intended to move the detection device; measure a time interval separating the maximum variation levels of the first and second detection signals; and generate a signal representative of an inclination amplitude of the metal stake of the hedge on the basis of the signal representative of the movement speed of the agricultural equipment, of the time interval and of a vertical spacing between the respective detection axes of the first and the second metal detector;

the electronic management unit may be configured for generating the signal representative of an inclination amplitude α of the metal stake of the hedge by using the formula $$\alpha = \arctan\left(\frac{V * \Delta t(incl) - L}{H}\right)$$

where V is a variable representative of a speed of movement of agricultural equipment such as indicated by the agricultural equipment itself, and where L represents a horizontal spacing between the respective detection axes of the first and the second metal detector;

the metal stake detector may further comprise a third metal detector arranged for generating a third measurement signal when it passes by the metal stake of the hedge, where the third metal detector may be mechanically secured in movement with the first and second metal detectors and spaced horizontally from the first metal detector, wherein the electronic management unit may further be configured for receiving the third detection signal, and, on the basis of respective moments of receiving maximum variation levels of the first and second detection signals, deliver a signal representative of a relative speed of movement of the detection device relative to the metal stake of the hedge;

the electronic management unit may be configured for generating the signal representative of an inclination amplitude α' of the metal stake of the hedge by using the formula $$\alpha' = \arctan\left(\frac{V_{rel} * \Delta t(incl) - L}{H}\right)$$

where $V_{rel}$ is a variable representative of a relative speed of movement between the detection device and the metal stake such as determined on the basis of measurement signals from the detection device, and where L represents a horizontal spacing between the respective detection axes (of the first and second metal detectors);

the third metal detector may comprise an emitting coil and a receiving coil defining a detection axis, where one of the emitting coils and the receiving coil may be mounted on the first gate branch and the other of the emitting coil and the receiving coil may be mounted on the second gate branch, and where the axis of detection of the third metal detector may, during use of the detection device, be spaced horizontally from the axis of the first metal detector; and the metal detectors may be part of pulsed induction magnetic detectors.

The invention may extend to mobile agricultural equipment for working crops in the form of wire-trained plant-crop hedges, which may comprise a working member and a metal stake detection device according to one of the preceding claims which is mounted ahead of the working member relative to a direction of movement of the agricultural equipment while working the wire-trained plant-crop hedges.

The agricultural equipment according to the invention may have the following characteristics:

the working member may have at least one active state and at least one neutralized state, where the working member is designed so as to be able to be driven by the electronic management unit so as to cause a temporary switch from the active state to the neutralized state and then a return to the active state in response to the generation of the signal indicating an inclined state of the metal stake; and the working member may comprise at least one assembly among: a pair of rotating blade cutting heads, where the rotating blades are intended to be, during use, oriented horizontally, located on either side of the wire-trained plant-crop hedge and traversing the trellis plane in the active state there are; two lateral cutting bars intended to be, during use, oriented substantially vertically and a horizontal cutting bar intended to be, during use, oriented substantially horizontally and designed for traversing the trellis plane so as to top the upper end of the wire-trained plant-crop hedge; and two berry detachment assemblies intended to shake the wire-trained plant-crop hedge so as to harvest the berries coming from this wire-trained plant-crop hedge.

The invention may also extend to a method for mobile agricultural equipment according to the invention to avoid metal stakes in a wire-trained plant-crop hedge, which may comprise moving of the mobile agricultural equipment parallel to a trellis plane of the hedge; working the wire-trained plant-crop hedge with the working member; and temporarily separating the working member from the trellis plane in response to the working member receiving the command signal issued by the electronic management unit.

The method of avoiding according to the invention may have the following characteristics:

temporarily moving the working member away may be done with a delay relative to the generation of the detection signal for an inclined metal stake, where the delay may be a function of the movement speed of the agricultural equipment and at least one among information about a direction of inclination of the stake and an amplitude of inclination of the stake.

BRIEF DESCRIPTION OF THE DRAWINGS

The present invention will be better understood and other advantages will appear upon reading the detailed description of the embodiment taken as a nonlimiting example and shown by the attached drawings, in which:

FIG. 1 is a general perspective view of the detection device, according to the invention, during use;

FIG. 2 is a perspective view of the detection device from FIG. 1;

FIG. 3A is a side schematic view of a detection device, according to the invention, in a general case;

FIG. 3B is a schematic of an electronic management unit connected to the device shown in FIG. 3A;

FIG. 4 is a side schematic view of the detection device in the specific case from FIG. 1;

FIG. 5A is an illustration of the operation of the detection device from FIG. 1 at a first moment;

FIG. 5B is an illustration of the operation of the detection device from FIG. 1 at a second moment following the first moment;

FIG. 5C is an illustration of the operation of the detection device from FIG. 1 at a third moment following the second moment;

FIG. 5D is an illustration of the operation of the detection device from FIG. 1 at a fourth moment following the third moment;

FIG. 5E is an illustration of the operation of the detection device from FIG. 1 at a fifth moment following the fourth moment;

FIG. 6A shows the principle of detection of being inclined and the direction of inclination of a stake based on data obtained according to FIG. 5;

FIG. 6B shows the principle of calculating the speed of movement of the agricultural equipment relative to the inclined stake from FIG. 6 on the basis of data obtained according to FIG. 5;

FIG. 7A shows a working member intended for a topping operation and which may be incorporated in agricultural equipment according to the invention;

FIG. 7B shows a working member intended for an operation of harvesting of a vine and which may be incorporated in agricultural equipment according to the invention; and FIG. 8 is a diagram showing a method for avoiding metal stakes according to the invention.

DETAILED DESCRIPTION OF THE INVENTION

The present embodiment gives an example of the application of the invention to agricultural equipment arranged and used with a working member for prepruning a vine wire trained using metal posts.

The pre-pruning operation consists of preparing for the manual, finish pruning of the vine, by cutting the shoots above the cordon while separating them from the trellis to which they are attached and tangled during the growth thereof; the viticulturist thus saves time during finish pruning with a better visibility of the shoots to be pruned.

During the pre-pruning operation, the working member operates through the trellis by means of two cutting stacks that need to be separated when passing a stake in order to avoid damaging both the working member and the stake.

However, on reading the following description it will be understood that this invention may be implemented for the equipment of other agricultural equipment such as topping machines, or even harvesting machines for example, and generally for any working member operating through the trellis while needing to change working conditions thereof when passing a stake.

All this agricultural equipment thus need to anticipate passing by a stake of the trellis, like the pre-pruning machine used on a wire-trained vine in the remainder of the present disclosure.

By adding the fact that most wired-trained vines are done with metal stakes and that agricultural equipment may need to work in the presence of vegetation which may mask the stakes, that then justifies the use of a metal stake detection device according to the invention.

FIG. 1 shows a metal-stake detection device 15 equipping agricultural equipment 20 for pre-pruning.

The pre-pruning equipment comprises a working member 50 made up of a pair of cutting heads with rotating cutting elements, where the rotating cutting elements S2 are oriented horizontally and located on either side of the wire-trained plant-crop hedge 60.

The detection device 15 comprises a metal stake detector 10 combined with an electronic management unit 14 in order to detect the stakes and inform the working member thereof when approaching the stake.

The hedge 60 is formed by an alignment of vine stems 62 planted along a trellis plane TP defined substantially by an alignment of metal stakes 70 on which are stretched training wires 75; most of the time these wires are metal.

This hedge defines two orthogonal directions $D_{mov}$, corresponding to the direction of movement of the agricultural equipment along the direction parallel to the trellis plane TP, and Desert, corresponding to a vertical direction which is substantially that of the metal stakes.

In the remainder the description, since the hedge is made entirely of metal stakes, the term stake will simply be used to designate these metal stakes.

In operation, the agricultural equipment 20 comprises a tractor 25 for moving at a speed V along the direction of movement $D_{mov}$ parallel to the alignment of stakes 70 and therefore to the trellis plane TP, as shown by FIG. 1.

During pre-pruning, the rotary cutting elements 52 of the cutting heads pass through the trellis plane in order to cut off the shoots 75 while moving parallel to the plane, and it is necessary to separate them at the moment when they pass by a stake 70.

The stakes 70 are mostly made of iron in order to provide stiffness thereto and long life thereto necessary for supporting the vine stems throughout the life thereof.

They can have, for example, metal angle shapes with a width of order 30 mm as shown in FIG. 1.

They can be coated with a coating protecting against rust like a simple surface treatment such as galvanizing or comprise a metal core covered with concrete or plastic.

It is thus possible to make use of the presence of a large quantity of iron in the stake in order to use a magnetic detection device.

The detection device 15 is mounted on the agricultural equipment 20 for prepruning, so as to be located ahead of the working member 50 during movement of the equipment during work.

In that way, a stake is detected before the working member comes close thereto, so that damage to the working member and/or to the stake can be avoided by anticipating and changing the mode of operation thereof.

In the case of the pre-pruner, the cutting elements are momentarily moved away from the trellis plane in order to avoid contact with the stake.

The stake detector 10 considered in this embodiment comprises three pairs of coils, respectively a first pair of coils 11A and 11B forming a first metal detector 11, a second pair of coils 12A and 12B forming a second metal detector 12, and a third pair of coils 13A and 13B forming a third metal detector 13.

The coils 11A, 11B, 12A, 12B, 13A and 13B are made of a winding of electrically conducting wire, in the form of circular turns, preferably substantially flat meaning with a thickness/diameter ratio preferably under 1/10 and more preferably under 1/20.

In this example, the metal detectors 11, 12 and 13 are identical and the coils forming them are connected by wire (connecting wire not shown in the figures) to an electronic management unit 14 configured for, independently for each metal detector, sending an emission signal to each of the coils 11A, 12A and 13A used as emitting coils and for detecting a measurement signal generated by each of the coils 11B, 12B and 13B used as receiving coils.

The electronic management unit 14 is arranged above the stakes 70 and separated from the stake detector 10, preferably on the top of the structure for the working member 50 so as to limit any interaction with signals generated in the detection device, but such an arrangement is in no way limiting and the invention is not limited to this option.

It is not necessary that the emitting coils 11A, 12A and 13A all be located on the same side of the vine.

Thus, the stake detector 10 is made up of three metal detectors 11, 12 and 13 arranged for operating separately, where each is driven by the electronic management unit 14.

In this embodiment, the three metal detectors driven by the electronic management unit 14 each form a pulsed induction magnetic detector.

The receiving coils 11A, 12A and 13A for the three pairs of coils are mounted on the first branch 40A of the detection gate 30 mounted on the agricultural equipment and the receiving coils 11B, 12B and 13B of each of the three pairs of coils are mounted on a second branch 40B of the detection gate.

The emitting coils 11A, 12A and 13A are fixed on a first, flat mounting plate 42A and the receiving coils 11B, 12B and 13B are fixed on a second flat mounting plate 42B, where the plates 42A and 42B are designed to be mounted respectively on the first and second branches 40A and 40B and where the plates as well as the coils are parallel to each other and, during use, to the trellis plane.

The mounting plates 42A and 42B are made of a nonmagnetic and electrically nonconducting materials so as to avoid coupling effects between the coils of a single plate or short-circuits.

That way, only significant magnetic masses such as the stakes are going to interact with the coils and further the coils will be protected from the plant hedge by the mounting plates.

The coils are considered as parallel to the plates in the meaning where the surfaces defined by the turns making up the coils are substantially parallel to each other and to the mounting plates to which the coils are respectively fixed.

The coils are arranged on the mounting plates 42 so as, during use, to be placed symmetrically about the trellis plane with the coils 11A, 12A and 13A respectively facing the coils 11B, 12B and 13B at substantially equal distances.

The coils, and therefore the detectors, are considered as being mechanically secured in movement, meaning that they are fixed in position relative to each other and are mounted so as to move together during operation, parallel to the trellis plane of the worked plant hedge.

The centers of the coils forming the three metal detectors 11, 12 and 13 respectively define detection axes $11ax$, $12ax$ and $13ax$ which are the axes of greatest intensity of the magnetic field generated by the emitting coils and which are intended to be, during use, perpendicular to the trellis plane TP, as shown in FIG. 2, and therefore horizontal.

Generally, the center of the coils is considered to be the center of mass of the electrically conducting wire turns which form them and this also applies to the case where the turns might not be circular.

FIG. 3A is used for describing a generic geometry for placement of the emitting coils, according to a view in a plane parallel to the trellis plane, the plane of the mounting plate 42A, which may also be defined by a vertical direction $D_{vert}$ and a direction of movement $D_{mov}$ of the detection device, by considering the ideal case of a straight-line movement parallel to the trellis plane over flat horizontal ground.

In this reference frame, L indicates the length separating the detection axes $11ax$ and $12ax$ of the first and second metal detectors 11 and 12 along the direction of movement $D_{mov}$, l indicates the length separating the detection axes $11ax$ and $13ax$ of the first and third metal detectors 11 and 13 along the direction of movement $D_{mov}$, H indicates the length separating the detection axis $11ax$ and $12ax$ of the first and second metal detectors 11 and 12 along the vertical direction $D_{vert}$, h13 indicates the length separating the detection axes $11ax$ and $13ax$ of the first and third metal detectors 11 and 13 along the vertical direction $D_{vert}$, and h32 indicates the length separating the detection axes $13ax$ and $12ax$ of the third and second metal detectors 13 and 12 along the vertical direction $D_{vert}$, with H=h13+h32.

In FIG. 3A, the axes are shown by a circle containing a cross and are perpendicular to the plane of the figure.

In this document, when distances or separations between two detectors are indicated, it is understood that it means distances or separations between the respective detection axes of these detectors.

Thus, when the detection device is mounted on agricultural equipment, the first detector 11 is separated vertically from the second detector 12 and located higher than it, the third detector 13 is separated vertically from the first and second detectors and preferably located at a vertical height between that of the first and second detectors, the first detector is separated horizontally from the third detector, and the second detector may possibly be separated horizontally from the first detector.

FIG. 4 is a variation of FIG. 3A and is different therefrom in that it shows the specific case selected for the present embodiment, in which the length L is zero and h13=h32=H/2, meaning that the first detection axis $11ax$ is aligned along a vertical direction $D_{vert}$ with the second detection axis $12ax$, and that the third detection axis $13ax$ is positioned midway between the first and second detection axes along the direction $D_{vert}$.

In this configuration, the stake detector 10 can be more compact making movement of the agricultural equipment easier, in particular when changing rows.

Unless indicated otherwise, the following explanations apply to the geometry shown in FIG. 4.

During working, the emitting and receiving coils of the detectors are arranged on either side of the row of vines so as to frame it and at a distance from each other so as to allow the row of vines to pass freely between them as the machine passes by moving forward in the row at speeds of order 10 km/h, as shown in FIG. 1.

Depending on the regions and varieties, the width of the vine is kept within dimensions of order 30 cm 70 cm, foliage included.

These data together with the speed of work therefore lead to having a large separation between the coils in order to allow for possible driving risks which could catch the device in the vegetation and damage the vine or even the device itself.

Because of the geometry thereof, the detectors used are directionally selective, each generating variations of a measurement signal when they pass near a metal object, meaning when the metal object is located substantially in the volume defined by the emitting and detecting coils of the detector under consideration, where a maximum variation of the measurement signal is generated when this metal object passes through the detection axis of the detector.

More specifically, the electronic management unit 14 of the various metal detectors is configured so as to cyclically and alternately supply power to the emitting coils of each of the metal detectors 11, 12 and 13 in order to charge them and then discharge them in order to generate eddy currents in a stake passing next to these detectors, where these currents reach the maximum intensity thereof when the stake passes the corresponding detection axes.

Charging an emitting coil consists of applying a voltage thereto so as to generate a measurable magnetic field in the corresponding detection coil.

The rapid discharge of the emitting coil induces a rapid variation of the magnetic field and therefore generates eddy currents in a metal stake passing in this magnetic field, where said eddy currents in the stake in turn generate a magnetic field which will be detected by the detection coil at a level different from the magnetic field measurement before discharge of the emitting coil, where this level is greater than a detection level without a stake, and passes through a maximum when the metal stake passes through the detection axis.

The values of these levels are shown at moments depending on the placement of the detection axes of the detectors and the relative movement of the detection device and the stake on the drawing from FIG. 5.

In order to not disturb the signals coming from the receiving coils, the emitting coils are powered alternately and the signals from the receiving coils are measured by the electronic management unit 14 synchronously with the power supplied to the emitting coils.

The frequency of powering each emitting coil is sufficiently high (of order 1 kHz) so as to detect sufficiently early the appearance of a metal stake before it gets near the tool considering the speed of movement of the agricultural equipment of about 10 km/h.

The stake of width 30 mm will thus pass through the detection axis of the detector during a time of order of 0.01 s and will therefore be the subject of some 10 measurements for each detector at this frequency.

For a detector defined by a set of 300 mm diameter coils, the stake will pass through the volume defined by the emitting and receiving coils in a time of order 0.1 seconds, then being the subject of around 100 measurements for each detector.

The measurements lead to the shapes of curves shown in FIGS. 5A to 5E, and 6A to 6B.

The FIGS. 5A to 5E show the principle of operation of the detection device for metal stakes in a wire-trained plant-crop hedge.

The FIGS. 5A to 5E schematically represent successive moments, in the sequence of figures, of the passage of the incline metal stakes $70_{incl}$ relative to the vertical $D_{vert}$ via a stake detector 10 with the first, second and third metal detectors 11, 12 and 13 according to view in a plane parallel to the trellis plane and in a configuration such as described in FIG. 4.

The drawings on the left of FIGS. 5A to 5E indicate a relative position of the working member 50 and the stake detector 10 relative to the inclined stake $70_{incl}$, where the working member and the detection device are moving with the speed V along the direction of movement $D_{mov}$.

The vertical line represents the moment corresponding to the configuration sketched the left of the figures.

The drawings on the right of FIGS. 5A to 5E indicate the variations in time t of the intensities of the first, second and third measurement signals, respectively referenced S1, S2 and S3 generated respectively by the receiving coils 11B, 12B and 13B.

In FIG. 5A, the working member 50 and also the stake detector 10 approach the inclined stake $70_{incl}$, where the stake is still too far away for significant variations for detection signals to be seen.

In FIG. 5B, the inclined stake is substantially on the axis of detection of the third metal detector 13, the farthest forward of the stake detector 10, and the third measurement signal S3 reaches the maximum level M3 of variation thereof; at the same moment, because of the direction of the inclination thereof, the stake has entered the detection range of the first metal detector 11 and already induced a growing variation of the first measurement signal S1, while the stake is not yet entered into the detection range of the second metal detector 12, and the second measurement signal S2 does not yet show any variations.

In FIG. 5C, the inclined stake has passed the axis of detection of the third metal detector but remains in the detection range thereof, the inclined stake is substantially on the detection axis of the first detector, and has come within detection range of the second detector, such that the variations of the third measurement signal S3 now show a downward variation, the first measurement signal S1 reaching the maximum level of variation thereof M1, and the second measurement signal S2 has an increasing variation.

In FIG. 5D, the inclined stake leaves the detection range of the third detector, goes past the detection axis of the first detector while remaining in the detection range thereof, and is substantially on the axis of detection of the second detector, such that the variations of the third measurement signal S3 are at the lowest level thereof, the variations of the first measurement signal S1 now have a decreasing variation, and the second measurement signal S2 has reached the maximum variation level M2 thereof.

In FIG. 5E, the inclined stake has left the detected ranges of each of the three detectors and the variations in the three measurement signals S1, S2 and S3 are again insignificant.

The inclined stake now arrives near the working member which is going to be inactive for the time necessary for the stake to completely pass by the working member.

The stake detector 10 passing by an inclined metal stake $70_{incl}$ thus induces the generation of three maximal detection levels M1, M2 and M3 offset in time from the measurement signals of the three metal detectors 11, 12 and 13 respectively.

The three signals shown in FIGS. 5A to 5E are of course idealized for explanatory purposes.

Electronic management unit 14 is configured for conventionally detecting the maximal signals M1, M2 and M3 of the respective variations of the measurement signals S1, S2 and S3 shown in FIGS. 5A to 5E and respectively corresponding to the passage of the stake at the level of each detection axis, and assigning a moment of detection to these maximal variation levels, moments respectively noted T1 and T2 and T3 corresponding to respective presence detections of the metal stake by means of the three detectors 11, 12 and 13.

In practice, the signals emitted by the detection coils could be influenced by other things than metal stakes, like, for example, trellis wires 75 or other metal elements such as for attachment (e.g., hooks, nails) located in the trellis.

However the metal masses involved in iron wire are much smaller than those of a stake and the distance separating the receiving coil from the emitting coil of a metal detector is large, greater than the distance H between two coils of a single gate branch, considering the width of the mat of vegetation of the wire-trained hedge and of the speed of forward movement of the stake detector 10.

Thus, small magnetic masses such as wires passing the detector will only have a small effect on the signal detected in the receiving coil, compared to a magnetic mass such as that of a stake.

In order to minimize the influence of these wires or other similar sources of influence, the electronic management unit 14 may be configured for disregarding any variation of the signals S1, S2 and S3 which do not exceed some set threshold, which could be adjustable by the user before use of the detection device, so as to avoid generating detection signals not caused by a metal stake and therefore considering them as artifacts to be disregarded.

The stakes of a single wire trained hedge in fact have identical magnetic masses, easily distinguished by a characteristic signal level from other magnetic masses which could potentially pass through the detection device.

This makes it possible among other things to adapt the inactivation threshold of the working member passing the stake to the quantity of iron contained in the stake.

As shown in FIG. 3B, the electronic management unit 14 comprises a calculation unit 14a, a signal input/output unit 14b, a clock 14c, a voltmeter 14d and a computer memory 14e.

This unit is configured so as to send cyclically emission signals Scom successively to each emission coil in order to receive the measurement signals S1, S2, S3 generated by the receiving coils at the input/output unit 14b, for as long if necessary, as a signal Sv is communicated by the tractor and relates to the speed of forward movement considered thereby.

Each signal coming from Scom in fact comprises the designation of the coil which will be activated.

During operation, the amplitudes of the measurement signals S1, S2 and S3 are measured by the voltmeter 14d and stored in the computer memory 14e at a sampling frequency corresponding to the supply frequency, where each measurement is dated by means of the clock 14c.

In the electronic management unit 14, the computer memory 14e can record the variations generated by the detection coils over a given time, to be determined by the practitioner as a function of their objectives, but sufficiently long in order to have simultaneously in memory the set of events related to passing an inclined stake, as a function of the expected maximum inclination and of the intended travel velocity of the agricultural equipment.

According to these same criteria, the given time can be defined sufficiently short that the recorded data only relate to measurement events connected to a single metal stake.

The calculation unit 14a is configured for executing calculations on the basis of data recorded in the memory so as to determine the presence of an inclined metal stake, the direction of inclination thereof, the amplitude of the inclination thereof, and a relative speed $V_{rel}$ of movement of the detection device relative to the metal stake of the hedge, as explained below with the help of FIG. 6B.

FIGS. 6A and 6B repeat a representation of the recording of signals S1, S2 and S3 representative of the detection device passing by an inclined metal stake, as shown in FIGS. 5A to 5E.

Basically, the detection of the peak in the detection signal, for example a peak corresponding to the maximum variation level M1 detected by means of the first metal detector, is indicative of the presence of a metal stake in the wiretrained plant hedge.

More elaborately, the detection results from three metal detectors can be put to use for getting more detailed information about the detected metal stake.

A temporal offset $\Delta t(incl)$ between the detections of maximal levels M1 and M2 of variations of the first and second signals S1 and S2 at moments T1 and T2 is shown in FIG. 6A.

In the case of the geometry described by FIG. 4, the simple existence of a significantly nonzero (based on measurement uncertainties related to the devices used) temporal offset $\Delta t(incl)$ is indicative of the presence of an inclined stake, in contrast to the presence of an upright stake, meaning extending along a vertical direction.

Electronic management unit 14 is designed for detecting such a substantially nonzero offset, where the tolerance may be selected by the user and, in response to this detection, and generating a signal Sind indicating the inclined state of a metal stake in order to generate the inactivation of the working member on passing the stake.

The following operations applicable to the case of an inclined stake, will only be implemented in case of positive detection of an inclined stake.

The temporal offset $\Delta t(incl)$ is obtained by subtraction $\Delta t(incl)=T2-T1$, such that the sign of the result $\Delta t(incl)$ provides information about the direction of inclination of the stake: in the case shown, since the first detector is higher than the second detector and the result of the subtraction T2−T1 is positive because the detection device goes by the inclined stake at the level of the second detector after going by at the level of the first detector, it can be deduced that the stake is inclined, from bottom to top, towards the detectors of the detection device and the working member or also forward compared to the direction of movement $D_{mov}$.

Conversely, if the result of the subtraction T2−T1 is negative, it can be deduced that the stake is inclined, from bottom to top, opposite to the detectors of the detection device in the working member, meaning backward relative to the direction of movement $D_{mov}$.

Thus, the electronic management unit 14 is designed so as to generate a signal $S_{dir}$ representative of the direction of inclination of the metal stake inclined in the trellis plane relative to a vertical direction on the basis of a time sequence of receiving at the electronic management unit said first and second maximal variation levels.

By additionally using the geometric characteristics L and H of the placement of the detectors 11 and 12, in combination with the signal $S_v$ representative of the speed V of movement of the agricultural equipment 20 and emitted thereby, the electronic management unit 14 is further capable of generating a signal $S_\alpha$ representative of an inclination amplitude α of the metal stake in the hedge based on the formula $$\alpha = \arctan\left(\frac{V*\Delta t(incl) - L}{H}\right),$$

were V*Δt(incl) represents the distance traveled by the agricultural equipment moving with the speed V in the direction of movement $D_{mov}$ between generation of the first and second maximum detection levels M1 and M2.

In the specific case of the geometry from FIG. 4, which is the case of the pre sent embodiment, the formula simplifies to $$\alpha = \arctan\left(\frac{V*\Delta t(incl)}{H}\right).$$

FIG. 6B shows a temporal offset $\Delta t(V_{rel})$ between, on the one hand, the maximum level M3 of the variations from the third signal at the moment T3, and, on the other hand, a moment located midway between the moments T1 and T2, where the moment is determined by a vertical position midway from the detection axis of this detector 13 relative to the detection axes the detectors 11 and 12.

This temporal offset $\Delta t(V_{rel})$, calculated by the electronic management unit 14, serves to improve and/or confirm the relative speed of movement $V_{rel}$ between the detection device and the metal stake by application of the formula $$V_{rel} = \frac{l}{\Delta t(v_{rel})}$$

where the distance l and the time interval $\Delta t(V_{rel})$ are shown by FIGS. 3A and 6B, respectively.

In fact, the speed V used in the formula $$\alpha = \arctan\left(\frac{V*\Delta t(incl) - L}{H}\right)$$

comes, for example, from a signal $S_v$ which is representative of this speed and which is generated and transmitted to the unit 14 by the agricultural equipment, for example by means of a speedometer.

However, this speedometer is not necessarily free from drifts, the initial calibration thereof may be insufficiently precise for the intended driving of the working member, or even a phenomenon of slipping of the wheels of the agricultural equipment could lead to a discrepancy between the speedometer reading and the effective speed of movement of the agricultural equipment.

Thus, the electronic management unit 14 is capable of generating a signal $S_{Vrel}$ representative of a more precise relative movement speed $V_{rel}$ between the detection device and the metal stake, and is also advantageously capable of replacing V by $V_{rel}$ in calculations performed by the electronic management unit 14, for example by replacing the inclination amplitude α by an inclination amplitude $$\alpha' = \arctan\left(\frac{V_{rel}*\Delta t(incl) - L}{H}\right),$$

$$\text{or } \alpha' = \arctan\left(\frac{V_{rel}*\Delta t(incl)}{H}\right)$$

in the case of FIG. 4.

In addition to detection of an inclined metal stake, the information deduced from the measurements coming from detectors 11, 12 and 13 as explained above can be considered in order to determine the direction of inclination thereof, the amplitude of the inclination thereof and the relative velocity of movement $V_{rel}$ thereof relative to the detection device.

In order to drive the working member, the calculation unit 14a of the electronic management unit 14 generates a signal $S_{com}$, intended for the working member on the basis of one or more signals $S_{incl}$, $S_{dir}$, $S_\alpha$ and $S_{Vrel}$, and servers to control the working member of the agricultural equipment so as to allow it to adequately avoid the metal stake depending in part on information including those signals and also on information determined by the user.

In fact, on the basis of this information, together with a three-dimensional bulk and a positioning of the working member relative to the stake detection device previously entered in the computer memory 14e by the user in the form of data $Info_W$, the calculation unit 14a will be able to precisely calculate the ideal moments of passing from an active state of the working member to a neutralized state, and then a return from the neutralized state to the active state for a given safety margin.

The active state is a state in which the working member actually works the hedge whereas the neutralized state is the state in which the working member does not actually work or less effectively works the hedge, either because cutting elements comprising it were separated from the hedge or because a mechanical force that it applies to the hedge, for example during a shaking operation in order to harvest fruit, was reduced.

After the generation thereof, the signals $S_{incl}$, $S_{dir}$, $S_\alpha$ and $S_{Vrel}$ may be recorded in the computer memory 14e or in an internal memory of the calculation unit 14a, in order to be reused by the calculation unit 14a during generation of the signal $S_{com}$ for control of the working member.

The present embodiment, shown by FIG. 1, relates specifically to a pre-pruning operation of a wire-trained vine, where the working member 50 is made up of a pair 52 of cutting heads with rotating blades framing the hedge, and where the cutting heads are oriented horizontally and located on both sides of the hedge during use.

Here, in active mode, the cutting heads are sufficiently close to the trellis plane that the rotating blades pass through this trellis plane.

Going past the metal stake with the cutting heads in active mode would result in immediate damages to the rotating blades and/or the metal stake.

A neutral mode is thus defined, corresponding to a separation of the cutting heads from the trellis plane, so as to avoid contact of the blades with the metal stake.

During working of a wire-trained vine, in response to a signal from the electronic management unit 14 representative of information collected by means of the metal detectors 11, 12 and 13, the cutting heads may be controlled by optimizing:
  i. the moment of switching thereof from the active mode to the neutralized mode when approaching a metal stake and
  ii. the moment of returning them to the active mode so as to reduce as much as possible the time in neutralized mode.

FIGS. 7A and 7B shows schematically the application of the detection device to two other examples of working members in a wire-trained vine, where, in the interest of clarity of the figures, only the working members and the trellis are shown.

The working member 720 from FIG. 7A is intended for a topping operation on a vine during growth in which the ends of the new shoots must be trimmed laterally and horizontally in order to improve the growth of grape berries.

The working member thus comprises two lateral cutting bars 722 generally oriented vertically during use and provided in the example shown with two rotating cutters 724 but these can also be replaced by alternating cutting bars.

It also comprises a horizontal cutting bar 721 generally oriented horizontally during use and which therefore passes through the trellis plane for topping the upper end of a wire-trained plant-crop hedge and must not collide with the stakes 70.

The neutralized mode of such a cutting bar 721 corresponds, during use, to lifting the cutting head to a height greater than that of the metal stake.

The working member 730 from FIG. 7B is a harvesting head intended for an operation of harvesting a vine.

For this purpose, the working member 730 comprises two assemblies 732 for detaching berries by tightening around and shaking the vine in a horizontal direction perpendicular to the trellis plane in order to make the berries fall.

The neutralized mode of such a fruit harvesting head reduces the intensity of mechanical shaking force applied to the wire-trained plant-crop hedge.

The shaking is thus largely deactivated on passing the stake 70 which thus undergoes only small oscillations as the assemblies for the detachment of berries pass.

Other examples of use of the detection device according to the invention are of course possible in agreement with the above description.

Similarly, other modes for deactivation are easily conceivable once the detection system has anticipated the arrival of the stake at the working member.

As shown by FIG. 8, a method for mobile agricultural equipment for avoiding 800 metal stakes in a wire-trained plant-crop hedge comprises entering 810 of characteristics of a working member (position relative to the detection device, dimensions), moving 820 of the mobile agricultural equipment parallel to a trellis plane of the hedge concomitant with working 830 of the wire-trained plant-crop hedges with the working member, detecting 840 an inclined metal stake by means of the metal stake detection device in a wire-trained plant-crop hedge according to the invention, temporarily separating 860 the working member from the trellis plane in response to receiving 850 by the working member a command signal issued by the electronic management unit 14 in response to the detection of an inclined stake.

The inclination signal may be generated by the electronic management unit 14 so as to be representative of, in addition to an indication of the presence of an inclined metal stake, the direction of inclination of the stake, the amplitude of the inclination, and/or the relative speed Vrel so as to more closely drive the change of the working member from the active state to the neutralized state, or the reverse.

More specifically, based on information contained in the inclination signal, the following can be controlled, possibly in combination with the speed of movement V: a delay following delivery of the detection signal before being applied to the temporary separation of the working member from the trellis plane where the delay is a function of the speed of movement of the agricultural equipment, represented by V or $V_{rel}$, and at least one among information on the direction of inclination of the stake and an inclination amplitude of the stake.

It is obvious that the present invention could not be in any way limited to the embodiments disclosed above which could undergo modifications without as such going outside the scope of the invention.

The invention claimed is:

1. A detection device for metal stakes in a wire-trained plant-crop hedge, comprising at least one metal stake detector designed for being moved parallel to a trellis plane of the hedge and arranged for generating a detection signal when it passes next to a metal stake of the hedge which comprises metal stakes, wherein said at least one metal stake detector comprises a first and a second metal detector arranged for generating respectively a first and a second measurement signal when they pass next to one of the metal stakes of the hedge, where said first and second metal detectors are mechanically secured to each other in movement and arranged for being spaced vertically relative to each other during use of said device, where the detection device further comprises an electronic management unit for said first and second detection signals, configured for receiving the first measurement signal and the second measurement signal and for, upon detection of a temporal offset ($\Delta t(incl)$) between the maximum variation levels of the first and second measurement signals, generating a signal ($S_{incl}$) indicating an inclined state of the metal stake relative to a vertical direction ($D_{vert}$) in the trellis plane.

2. The detection device according to claim 1, wherein an electronic management unit is configured for generating a signal ($S_{dir}$) representative of a direction of inclination of the inclined metal stake on the basis of a time-sequence order between the maximum variation levels of the first and second measurement signals.

3. The detection device according to claim 1, wherein the first and second metal detectors each comprise an emitting coil and a receiving coil defining a detection axis on which a metal stake detection signal generated by the detection coil in response to a signal coming from the receiving coil is a maximum when the corresponding detector passes next to a metal stake, and the first and second measurement signal can be generated by the detection coil of the first and second detectors, respectively.

4. The detection device according to claim 3 comprising a detection gate mobile along the trellis plane, where said detection gate comprises a first and a second gate branch designed for, during use, facing and moving parallel to the trellis plane, where the first gate branch comprises one of the emitting coils and of the receiving coils of the first and the second metal detector, where the second gate branch comprises the other of the emitting coil and the receiving coil of the first and second metal detectors, where the coils are mounted on the gate branches such that, during use, the detection axes of the metal detectors are vertically separated from each other.

5. The detection device according to claim 4, wherein the first gate branch and the second gate branch are designed for, during use, framing the trellis plane.

6. The detection device according to claim 4, wherein the electronic management unit is further configured so as to:
- receive a signal ($S_V$) representative of a movement speed (V) of agricultural equipment, generated and sent by the agricultural equipment intended to move the detection device;
- measure a time interval (Δt(incl)) separating the maximum variation levels of the first and second detection signals; and
- generate a signal ($S_\alpha$) representative of an inclination amplitude of the metal stake of the hedge on the basis of the signal ($S_V$) representative of the movement speed of the agricultural equipment, of the time interval (Δt(incl)) and of a vertical spacing (H) between the respective detection axes of the first and the second metal detector.

7. The detection device according to claim 6, wherein the electronic management unit is configured for generating the signal ($S_\alpha$) representative of an inclination amplitude α of the metal stake of the hedge by using the formula $$\alpha = \arctan\left(\frac{V * \Delta t(incl) - L}{H}\right)$$

where V is a variable representative of a speed of movement of agricultural equipment such as indicated by the agricultural equipment itself, and where L represents a horizontal spacing between the respective detection axes of the first and the second metal detector.

8. The metal stakes detection device according to claim 7, where the metal stake detector further comprises a third metal detector arranged for generating a third measurement signal when it passes by the metal stake of the hedge, where the third metal detector is mechanically secured in movement with the first and second metal detectors and spaced horizontally from the first metal detector, wherein the electronic management unit is further configured for receiving the third detection signal, and, on the basis of respective moments of receiving maximum variation levels of the first and second detection signals (deliver a signal ($S_{V_{rev}}$) representative of a relative speed of movement of the detection device relative to the metal stake of the hedge.

9. The detection device according to claim 8, wherein the electronic management unit is configured for generating the signal ($S_\alpha$) representative of an inclination amplitude α' of the metal stake of the hedge by using the formula $$\alpha' = \arctan\left(\frac{V_{rel} * \Delta t(incl) - L}{H}\right)$$

where $V_{rel}$ is a variable representative of a relative speed of movement between the detection device and the metal stake such as determined on the basis of measurement signals from the detection device, and where L represents a horizontal spacing between the respective detection axes of the first and second metal detectors.

10. The detection device (15) for metal stakes according to claim 4, where the metal stake detector further comprises a third metal detector arranged for generating a third measurement signal when it passes by the metal stake of the hedge, where the third metal detector is mechanically secured in movement with the first and second metal detectors and spaced horizontally from the first metal detector, wherein the electronic management unit is further configured for receiving the third detection signal, and, on the basis of respective moments of receiving maximum variation levels of the first and second detection signals (deliver a signal ($S_{V_{rev}}$) representative of a relative speed of movement of the detection device relative to the metal stake of the hedge;
the third metal detector comprising an emitting coil and a receiving coil defining a detection axis, where one of the emitting coil and the receiving coil are mounted on the first gate branch and the other of the emitting coil and the receiving coil are mounted on the second gate branch, and where the axis of detection of the third metal detector are, during use of the detection device, spaced horizontally from the axis of the first metal detector.

11. The detection device according to claim 1, wherein the metal detectors are part of pulsed induction magnetic detectors.

12. Mobile agricultural equipment for working crops in the form of wire-trained plant-crop hedges, which comprises a working member and a metal stake detection device according to claim 1, which is mounted ahead of the working member relative to a direction of movement ($D_{mov}$) of the agricultural equipment while working the wiretrained plant-crop hedges.

13. The agricultural equipment according to claim 12, the working member having at least one active state and at least one neutralized state, where the working member is designed so as to be able to be driven by the electronic management unit so as to cause a temporary switch from the active state to the neutralized state and then a return to the active state in response to the generation of the signal ($S_{incl}$) indicating an inclined state of the metal stake.

14. The agricultural equipment according to claim 12, wherein the working member comprises at least one assembly among:
- a pair of rotating blade cutting heads, where the rotating blades are intended to be, during use, oriented horizontally, located on either side of the wire-trained plant-crop hedge and traversing the trellis plane in the active state thereof;
- two lateral cutting bars intended to be, during use, oriented substantially vertically and a horizontal cutting bar intended to be, during use, oriented substantially horizontally and designed for traversing the trellis plane so as to top the upper end of the wiretrained plant-crop hedge; and
- two berry detachment assemblies intended to shake the wire-trained plant-crop hedge so as to harvest the berries coming from this wire-trained plant-crop hedge.

15. A method for mobile agricultural equipment according to claim 12 to avoid metal stakes in a wire-trained plant-crop hedge, the method comprising:
- moving of the mobile agricultural equipment parallel to a trellis plane of the hedge;
- working the wire-trained plant-crop hedge with the working member; and
- temporarily separating the working member away from the trellis plane in response to the working member receiving the command signal ($S_{com}$) issued by the electronic management unit.

16. The method to avoid metal stakes according to claim 15 wherein temporarily separating the working member away is done with a delay relative to the generation of the detection signal for an inclined metal stake, where the delay is a function of the movement speed (V, $V_{rel}$) of the agricultural equipment and at least one among information about a direction of inclination of the stake and an amplitude of inclination of the stake.

* * * * *